United States Patent

Lou et al.

(10) Patent No.: US 9,595,277 B2
(45) Date of Patent: Mar. 14, 2017

(54) THERMALLY ASSISTED WRITER PROTRUSION DETERMINATION AND CONTROL

(71) Applicant: Seagate Technology LLC, Cupertino, CA (US)

(72) Inventors: Huazhou Lou, Eden Prairie, MN (US); Jason W. Riddering, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/797,697

(22) Filed: Jul. 13, 2015

(65) Prior Publication Data

US 2017/0018284 A1 Jan. 19, 2017

(51) Int. Cl.
G11B 5/60 (2006.01)

(52) U.S. Cl.
CPC ............ *G11B 5/6029* (2013.01); *G11B 5/607* (2013.01)

(58) Field of Classification Search
None
See application file for complete search history.

(56) References Cited

U.S. PATENT DOCUMENTS

| | | | |
|---|---|---|---|
| 7,508,617 B1 | 3/2009 | Mak et al. | |
| 8,169,729 B2 | 5/2012 | Zaitsu et al. | |
| 8,787,125 B1 | 7/2014 | Lee | |
| 8,842,506 B1 | 9/2014 | Matsumoto et al. | |
| 8,873,353 B1 * | 10/2014 | Riddering | G11B 5/314 369/13.33 |
| 9,202,490 B2 * | 12/2015 | Zuckerman | G11B 5/4866 |
| 2009/0251828 A1 | 10/2009 | Schreck et al. | |
| 2011/0235208 A1 | 9/2011 | Yang | |
| 2013/0077453 A1 | 3/2013 | Alex | |

* cited by examiner

*Primary Examiner* — K. Wong
(74) *Attorney, Agent, or Firm* — Hall Estill Attorneys at Law (57) ABSTRACT

Method and apparatus for controlling the fly height of a transducer. In some embodiments, a data pattern is written to a rotating data recording surface using a transducer having a write element, a read element and a thermal assist energy source. A first protrusion distance for the read element induced by operation of the energy source is determined responsive to first and second readback amplitudes obtained from the data pattern using different first and second power levels applied to the energy source. A second protrusion distance for the write element induced by the energy source is determined responsive to the first protrusion distance.

20 Claims, 5 Drawing Sheets

THERMALLY ASSISTED WRITER PROTRUSION DETERMINATION AND CONTROL

SUMMARY

Various embodiments of the present invention are generally directed to controlling fly height of a transducer.

In accordance with some embodiments, a data pattern is written to a rotating data recording surface using a transducer having a write element, a read element and a thermal assist energy source. A first protrusion distance for the read element induced by operation of the energy source is determined responsive to first and second readback amplitudes obtained from the data pattern using different first and second power levels applied to the energy source. A second protrusion distance for the write element induced by the energy source is determined responsive to the first protrusion distance.

These and other features and advantages which characterize the various embodiments of the present disclosure can be understood in view of the following detailed discussion and the accompanying drawings.

DETAILED DESCRIPTION

The present disclosure is generally directed to data storage, and more particularly to devices and methods for controlling the fly height of a data transducer adjacent a rotatable data recording medium.

Some data storage devices such as hard disc drives (HDDs) store data on one or more rotatable magnetic recording media (discs). The discs are accessed by a corresponding array of read/write transducers (heads). The transducers are supported adjacent the disc surfaces by fluidic currents established by high speed rotation of the discs. Current generation transducers may be flown at fly heights in the range of tens of Angstroms (e.g., $10^{-9}$ m) and it is expected that fly heights will continue to decrease in the future.

HDDs often define concentric tracks on the various disc recording surfaces. Data are written to the tracks using a magnetic write element with a coil that generates magnetic write fields which establish sequential magnetization patterns in a recording layer of the associated surface. Data are read from the tracks using one or more read sensors that sense the previously written magnetization patterns.

Besides the write and read elements, transducers can include a number of additional operative elements. A slider body can be provided with an air bearing surface (ABS) designed to maintain the transducer in a stable flying relation above the medium during read and write operations. A fly height adjustment (FHA) mechanism can be used to adjust the fly height through heating and thermal expansion of the slider body, thereby bringing the write and read elements closer to the media surface. Proximity and/or contact sensors can be used to detect physical contact between the transducer and the medium. Other elements can be incorporated into the transducer as well.

Various strategies have been employed to enhance areal density of the recorded data on a magnetic recording disc. One such strategy is sometimes referred to as thermally assisted recording, such as heat assisted magnetic recording (HAMR). In a HAMR system, an energy source such as a laser diode is affixed adjacent the write element. Electromagnetic energy from the laser diode is focused and transmitted through a wave guide and/or a near field transducer onto the medium. The transmitted energy temporarily increases the localized temperature of the medium. By raising the localized temperature of the medium to a level that approaches or exceeds the Curie temperature, the magnetic coercivity of the magnetic material of the recording layer can be significantly reduced, allowing the layer to be written (magnetized) by the write element. Once written, the medium cools to an ambient temperature and the native coercivity of the magnetic material allows the written magnetized pattern to be maintained in a highly stable condition.

While operable, one drawback to the use of HAMR and other thermally assisted recording techniques is that the energy used to locally heat the medium can also tend to heat the transducer as well. This can cause undesired head protrusion as the slider body or other aspects of the transducer thermally expand and bring the write and read elements closer to the medium. This phenomenon is referred to herein as "writer protrusion" or "laser induced head protrusion." Writer protrusion brings the write element closer than intended to the corresponding media surface. In some cases, writer protrusion may result in undesired contact of the transducer with the media surface, which may damage the head/disc interface and can be detrimental to the reliability of the HAMR system.

Normally, calibration processing can be carried out during fly height adjustment routines to correlate different fly heights for different heater (FHA) settings. Such processing can include decreasing the fly height of the transducer to the point where contact is established between the transducer and the disc. Thereafter, the FHA settings can be reduced to bring the fly height to a desired clearance level. A problem with these and other fly height adjustment techniques is that such adjustments generally fail to account for the additional thermal expansion that may arise from operation of the HAMR system. Moreover, using a fly height adjustment technique that intentionally induces head/disc contact while the HAMR system is in an operational mode can damage the HAMR system.

Accordingly, various embodiments are generally directed to a method and apparatus for storing data in a data storage device that addresses these and other limitations of the art. In accordance with various embodiments, a fixed magnetic data pattern is written to a corresponding data recording medium. The pattern may take a variety of forms, such as but not limited to a 2 T pattern. The transducer is positioned such that a reader element is placed in a sensing relation to the written track. As desired, a baseline fly height may be established using a first fly height adjustment (FHA) value.

The track is write stressed by turning on the electromagnetic source (e.g., laser) for a first portion of the track, which may be characterized as a total number of N−1 sectors. Each sector is used to store the written pattern and has a selected physical length along the track to store a selected amount of user data (e.g., 512 bytes, etc.).

Immediately after the write stress operation, the transducer is configured to read a second portion of the track, such as the Nth sector. A first amplitude of the readback signal from the second portion of the track is measured. While maintaining the same fly height and laser power, the foregoing steps are repeated using a different laser power to provide a second amplitude of the readback signal for the second portion of the track.

The respective first and second amplitudes of readback signal can be used to identify a head/disc clearance change for the reader. One way this can be accomplished is through the well-known Wallace spacing loss equation, although other techniques can be applied. The measured clearance change can be attributed to laser induced reader protrusion, which indicates how much change in clearance (fly height) of the transducer can be attributed to the change in power level of the laser, and the associated thermal expansion of the transducer induced thereby. This analysis provides an accurate indication of the change in reader element clearance from the disc.

A scaling factor, referred to herein as gamma (γ), is empirically derived and used to convert the laser induced reader protrusion to laser induced writer protrusion. This is based in part on an observation by the present inventors that the amount of reader protrusion may be different from the amount of writer protrusion due to thermal expansion from the laser source. A clearance versus laser current transfer function can be generated using curve and surface fitting techniques to describe the relationship between input laser power to the HAMR module and the resulting change in fly height of the transducer for the write element.

During subsequent write operations, the heater power (FHA adjustment mechanism) can be selected based on the laser power value and the transfer function. In this way, a desired clearance can be established during write operations that takes into account the reduction in fly height expected to occur for the writer using different laser power settings.

During field operation of the device, laser induced writer protrusion can be periodically measured to monitor the health of the laser, the near field transducer and the head/disc interface. As required, changes can be made to the commanded laser power and other parameters to maintain the requisite target clearance during write operations.

Figure 1:
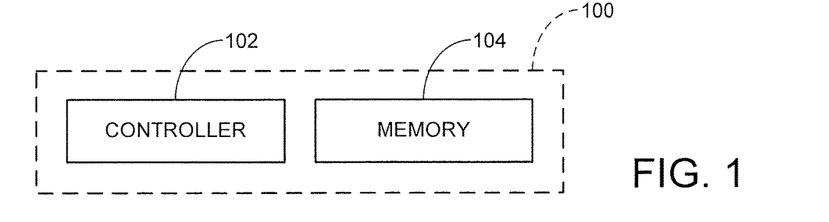
FIG. 1 is a functional block representation of a data storage device constructed and operated in accordance with various embodiments of the present disclosure.

These and other features and advantages of various embodiments can be understood beginning with a review of FIG. 1 which provides a generalized functional block diagram of a data storage device 100. The device 100 includes a controller 102 and a memory module 104. The controller 102 constitutes a top level controller that carries out overall communication and control functions with a host device (not separately shown). The memory module 104 stores data supplied by the host device and retrieves the data as required.

Figure 2:
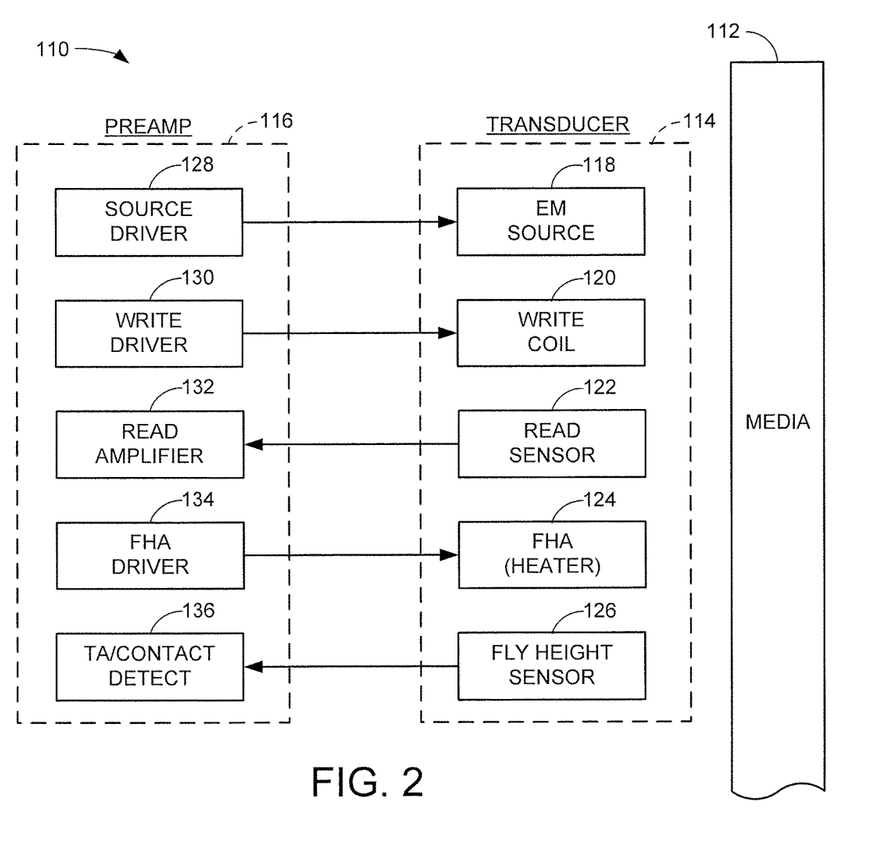
FIG. 2 shows aspects of the device of FIG. 1 in accordance with some embodiments.

FIG. 2 shows a functional block diagram of relevant portions of a data storage device 110 similar to the device 100 in FIG. 1. Other configurations can be used. The device 110 is characterized as a hard disc drive (HDD) and includes a rotatable magnetic recording medium 112 to which data are written and from which data are retrieved using a data read/write transducer 114. Data and control signals are communicated between the transducer 114 and a preamplifier/driver circuit (preamp) 116 during write and read operations.

The transducer 114 includes an electromagnetic source (e.g., laser) 118, a write coil (e.g., write element or writer) 120, a read sensor (e.g., read element or reader) 122, a fly height adjustment (FHA) mechanism (e.g., heater) 124 and a fly height sensor 126.

The electromagnetic source 118 generates electromagnetic energy in a thermally assisted recording system, such as a heat-assisted magnetic recording (HAMR) system, in which a localized spot on the medium 112 is heated to assist in writing data to the magnetic recording medium. The heat applied by the electromagnetic source 118 changes the magnetic properties (e.g., magnetic coercivity) of the medium to make writing data to the medium easier. For purposes of the present discussion, the electromagnetic source 118 will be contemplated as comprising a laser diode, although other forms can be used including a microwave source for microwave assisted magnetic recording (MAMR). Various elements may be incorporated into the HAMR system including a waveguide, a near field transistor (NFT), etc.

The write coil 120 is adapted to magnetize the magnetic recording media for writing data to the media, and may take the form of a perpendicular magnetic recording element. The read sensor 122 is adapted to recover recorded data from the magnetic recording medium and may take a magnetoresistive (MR) construction. The heater 124 is adapted to adjust (reduce) the fly height of the transducer 114 through thermal expansion of a slider body (not separately shown) to which the various elements shown in FIG. 2 are mounted. The fly height sensor 126 senses a clearance distance (fly height) between the slider and the medium 112.

The preamp 116 includes a source driver circuit 128 for driving the electromagnetic source 118, a differential transconductance writer driver circuit 130 for driving the writer coil 120 with a programmable current level, a read amplifier 132 for processing readback signals from the read sensor 122, a fly height adjustment (FHA) heater driver 134 for supplying electrical current to the heater 124, and a thermal asperity (TA)/contact detection circuit 126 for processing fly height signals from sensor 126. Other configurations are envisioned, including configurations that omit one or more of these elements, configurations that use multiple ones of these elements (e.g., a multi-read sensor transducer, etc.), configurations that include additional elements such as photo detectors or other fly height adjustment mechanisms, microactuators, etc. Suitable electrical supply power is applied to the various preamp components and transducer to facilitate operation.

Figure 3:
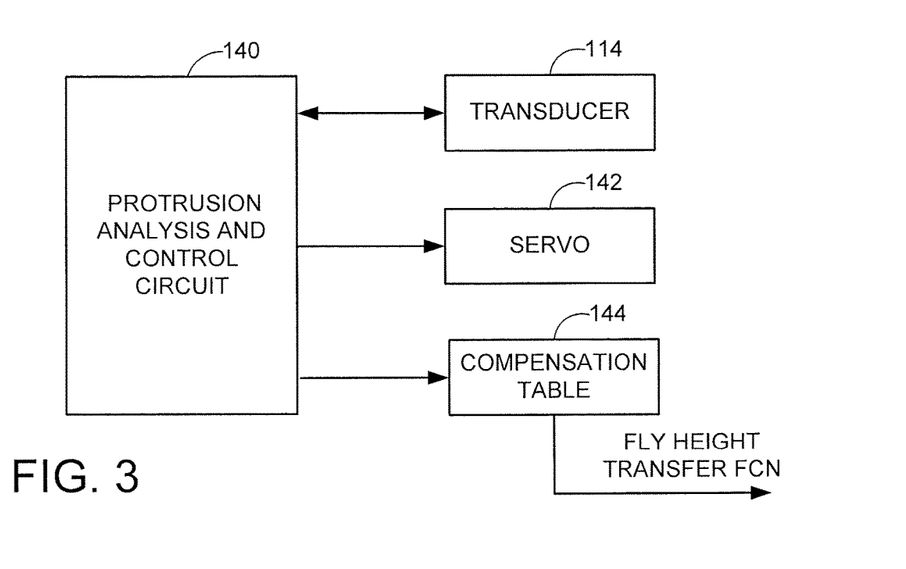
FIG. 3 shows a protrusion analysis and control circuit of the device of FIG. 2 in some embodiments.

FIG. 3 is a functional block representation of circuitry of the device 110 of FIG. 2 in accordance with some embodiments. A protrusion analysis and control circuit 140 performs various steps explained below to develop a transfer function that relates the fly height of the write element (write coil) 120 to laser power (input to source driver 128). In this way, suitable control inputs can be supplied to various elements of the transducer and preamp, such as the source driver, the FHA driver, the write driver, etc. to establish a desired stable fly height during write operations.

The protrusion analysis and control circuit 140 can be realized as hardware, software and/or firmware. In some cases, the circuit 140 operates as part of the top level controller (e.g., 102 in FIG. 1). In other cases, the circuit 140 is incorporated into the memory module 104. Programming steps may be stored in a suitable memory location and executed by a programmable processor, or the circuitry may be formed as a hardware state machine or other application specific integrated circuit (ASIC) circuit.

The circuit 140 interacts with the transducer 114, either directly or by way of the preamp 116. The circuit 140 additionally interacts with a servo control circuit 142 adapted to controllably position the transducer 114 adjacent different tracks defined on the medium 112. In some embodiments, the circuit 140 generates data arranged as a data structure such as a compensation table in a memory 144, from which a fly height transfer function (fcn) can be generated.

Figure 4:
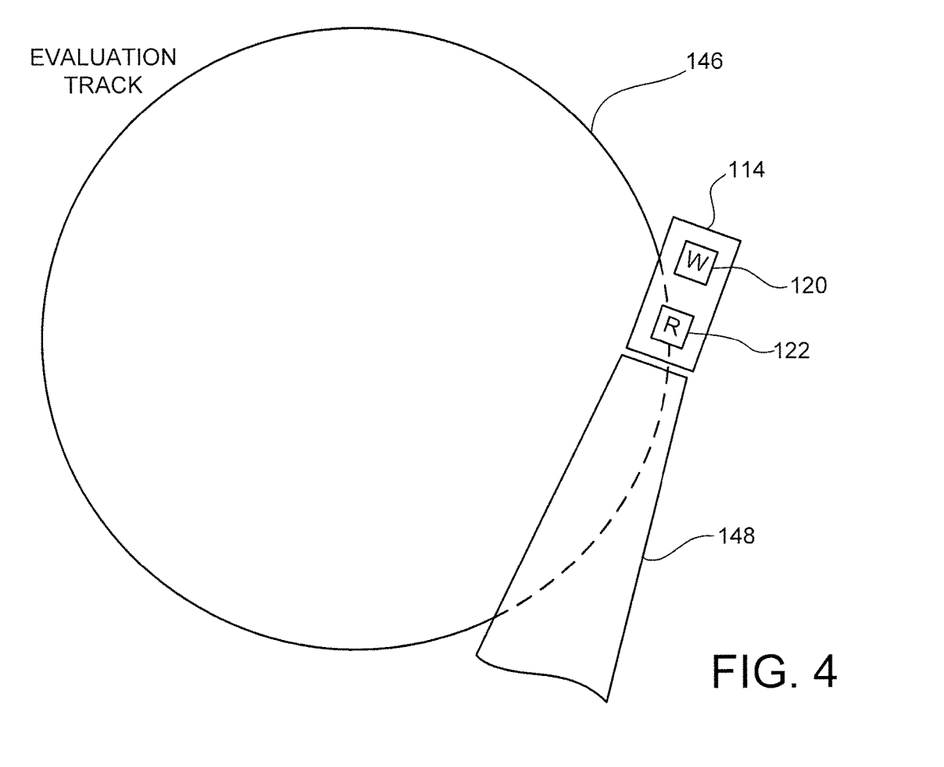
FIG. 4 illustrates placement of the transducer of FIG. 2 adjacent an evaluation track.

FIG. 4 is a schematic representation of the transducer 114 in conjunction with a selected track 146 on the medium 112. The track may be a normal track otherwise used for the storage of user data, or may represent a special calibration track. The track may be arranged to have a series of spaced apart servo data fields that periodically provide servo control data to the servo circuit 144 to enable the transducer to remain positioned over the track. Fixed sized user data fields, or sectors, may be defined along the track between adjacent pairs of the servo fields.

The transducer 114 is supported at a distal end of an actuator arm 148 that pivots about an actuator pivot point adjacent an outermost periphery of the medium 112. The actuator arm may include a rigid e-block, a flexible suspension (flexure), a head-gimbal assembly (HGA), a microactuator, etc. to enable the transducer 114 to fly in a stable relation at a desired position along multiple axes adjacent the track 146.

Positioning the read element 122 over the track 146 may result in some amount of radial offset of the write element 120 with respect to the track, such as represented in FIG. 4. The amount of reader/writer offset will depend on a number of factors such as the relative arrangement of the write (W) and read (R) elements 120, 122 within the traducer 114 and the skew angle of the transducer with respect to the medium 112.

Figure 5:
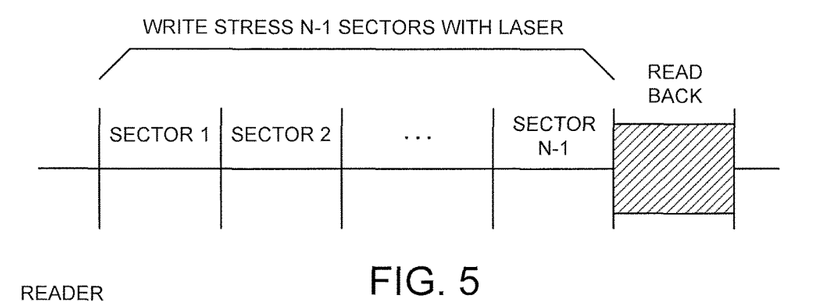
FIG. 5 is an analysis sequence carried out by the circuit of FIG. 3 in some embodiments.

FIG. 5 is a schematic depiction of the operation of the circuit 140 as the transducer 114 is maintained adjacent the evaluation track 146 as depicted in FIG. 4. In some embodiments, an initial test pattern is written to N data sectors along the track, where N is a plural integer. Once written, the read element 122 is nominally aligned over the track and a first portion of the sectors (e.g., sectors 1 to N−1) are write stressed by applying laser power to the laser 118. No data are written during this time. The write stress operation may include the assertion of a write gate (WG) signal to the preamp 116 and a selected input to the laser driver 128. No write inputs are supplied to the write driver 130, however, during this operation. As desired, an initial fly height adjustment (FHA) value may be supplied to the FHA driver 134 to nominally set the fly height of the transducer 114.

At the conclusion of the write stress operation, a second portion of the sectors (e.g., sector N) is read by the read element 122. This, may include the deassertion of the write gate signal and assertion of a read gate (RG) signal to the preamp 116. An overall signal magnitude (peak-to-peak) is obtained using the read amplifier circuit 132. The magnitude can be captured in any number of suitable ways, including the output of automatic gain control (AGC) circuitry of the preamp.

The foregoing steps are repeated using a different input power setting for the laser driver 128. That is, the read element 122 is again positioned over the track, sectors 1 to N−1 are write stressed using a second power setting for the laser, and a second overall magnitude (peak-to-peak) is obtained for sector N. The same baseline FHA value may be provided to establish a nominal fly height. A suitable cooling off period can be inserted between the two passes to enable the transducer to return to an ambient baseline temperature. It will be appreciated that changes in the actual fly height during these respective passes will substantially be due to the thermal expansion resulting from the operation of the laser source.

Figure 6:
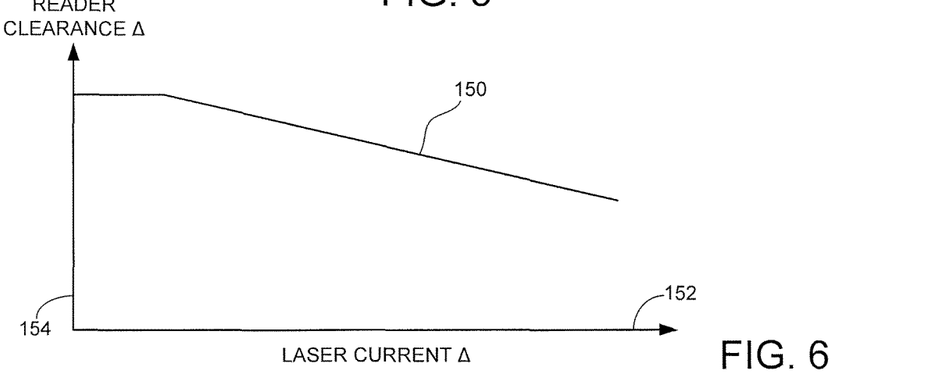
FIG. 6 is a graphical representation of the relationship between reader clearance and laser power for the transducer of FIG. 4.

The change in readback signal amplitude is thereafter correlated to a change in head/disc clearance with respect to the read element 122. In some embodiments, the well-known Wallace Spacing Loss Equation can be used to establish this change in fly height. If A1 represents the amplitude at the first laser power P1 and A2 represents the amplitude at the second laser power P2, then:

$$\frac{A1}{A2} = e^{\wedge}[-2\pi(\Delta d)/\lambda] \tag{1}$$

where $\Delta d$ is the change in clearance distance of the read element 122 and $\lambda$ is the write spatial wavelength at which the track 146 was written. By repetitively performing the above steps for different laser power values, a clearance change relation curve can be constructed for reader clearance versus laser power (e.g., current) as shown by FIG. 6.

More particularly, FIG. 6 provides a curve 150 plotted against a laser power change (delta) axis 152 and a reader clearance change (delta) axis 154. It is contemplated that the axes 152, 154 are logarithmic although such is not necessarily required. The curve 150 has a substantially linear constant) portion for low levels of laser power, and then decreases in a linear logarithmic rate above a selected threshold. The curve 150 can be used as desired to predict or estimate changes in reader clearance for different changes of input laser power.

Figure 7:
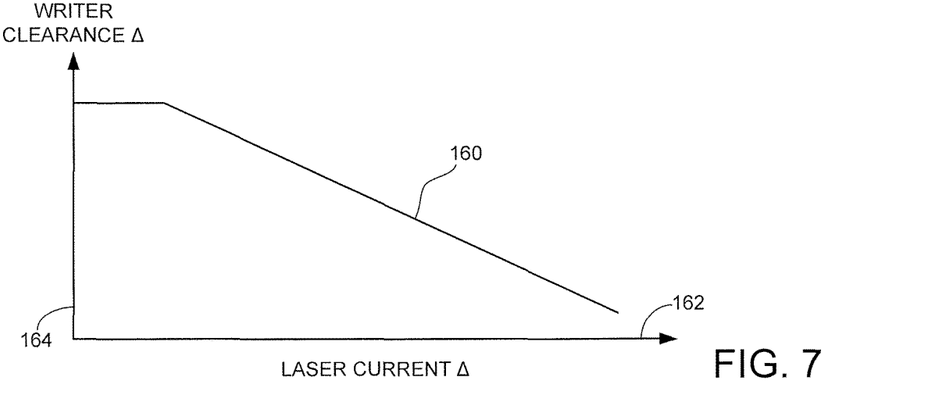
FIG. 7 is a graphical representation of the relationship between writer/near field transducer clearance and laser power for the transducer of FIG. 4.

It has been determined by the present inventors that laser induced writer protrusion (that is, changes in fly height of the write element 120) may often be different than laser induced reader protrusion (that is, changes in fly height of the read element 122 as depicted in FIG. 6). Curve 160 in FIG. 7 provides a laser induced writer protrusion relationship between laser power change (axis 162) and writer clearance change axis 164). Curve 160 exhibits a decrease in writer clearance at a significantly greater rate than the reader clearance of curve 150. A variety of factors may account for these differences including differences of construction of the respective elements and relative placement of the elements with respect to the laser source.

A gamma ($\gamma$) scaling factor can be used to convert the reader clearance values obtained from FIGS. 5-6 to the writer clearance values represented in FIG. 7. For example, the conversion can be carried out as follows:

$$WP=RP(\gamma) \quad (2)$$

where WP is the estimated writer protrusion change and RP is the measured reader protrusion change for the given power level change. Other conversion mechanisms can be empirically determined.

To develop the gamma scaling conversion factor, the writer clearance versus laser power characteristics of a given device such as 110 can be directly measured using a factor process calibration operation during device manufacturing. Direct measurements can be carried out using laser inferometers or other precise measurement equipment for different laser power settings. Curve and surface fitting techniques can be applied to reduce measurement noise. Each device can be measured individually or empirical measurements can be taken from a statistically significant population of devices and applied to an entire class of subsequently manufactured devices.

Once the direct writer clearance change characteristics are known, a clearance laser transfer function can be formulated that converts measurable reader clearance for a given device to the corresponding writer clearance and enables the final writer clearance to be estimated based on a given input laser power value.

Figure 8:
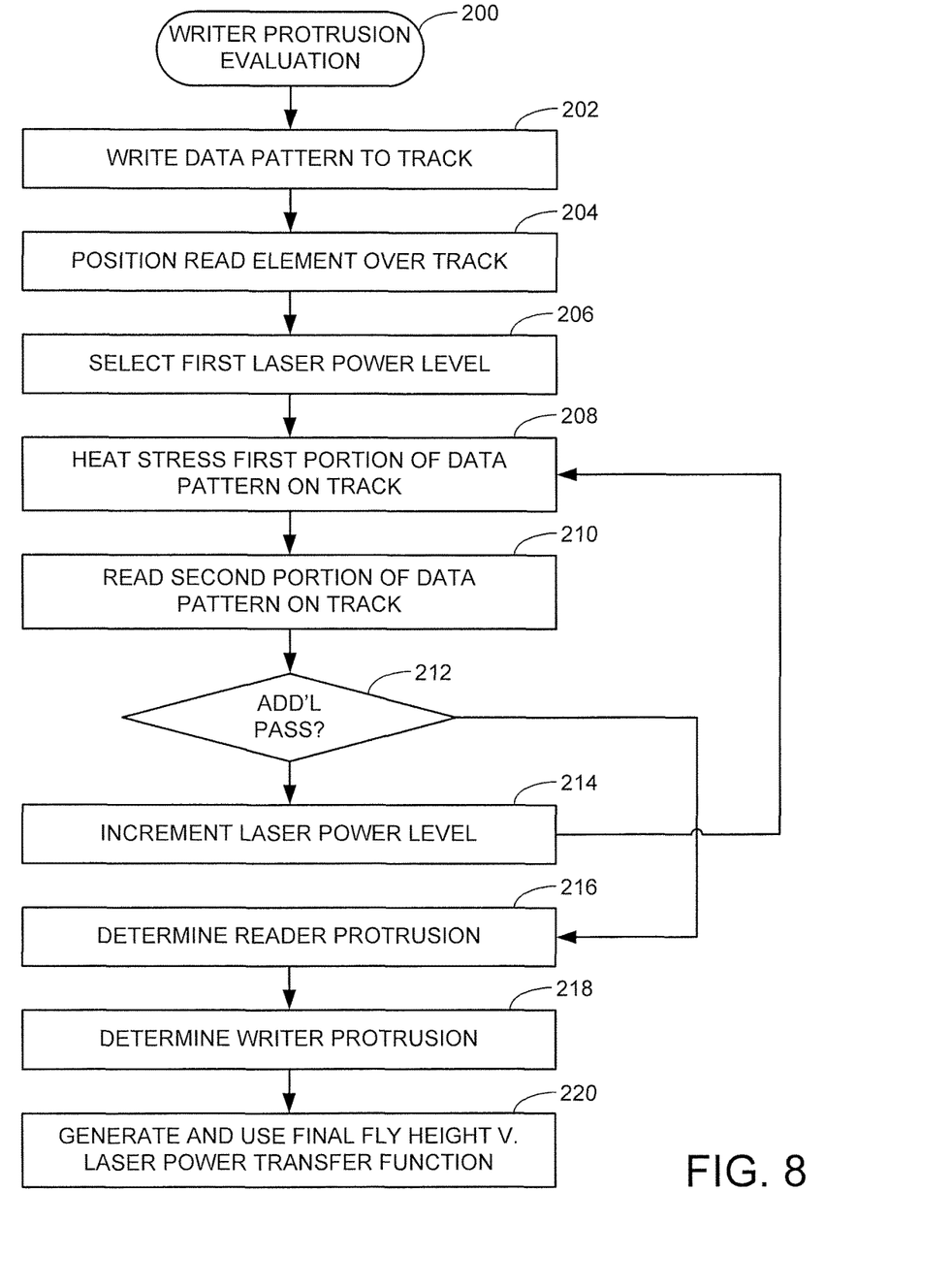
FIG. 8 is a writer protrusion evaluation routine illustrative of steps carried out in accordance with various embodiments of the present disclosure.

FIG. 8 is a flow chart for a writer protrusion evaluation routine 200 carried out by the circuit 140 in accordance with some embodiments. The routine 200 may be performed by the storage device 110 at various suitable times including during manufacturing and field operation. Periodic operation of the routine can help detect and compensate for system degradation over time.

A selected data pattern is initially written to a selected track at step 202, such as a 2 T or random pattern. The read element 122 is oriented over the selected track as in FIG. 4 at step 204. A first laser power level is selected at step 206, and a first portion of the data sectors on the selected track (e.g., sectors 1 to N−1) are heat stressed at step 208 using the selected laser power level. A second portion of the data sectors (e.g., sector N) is read at step 212 to obtain a first signal amplitude. While only a single sector (sector N) is read, such is merely illustrative and not limiting. Any suitable numbers of sectors (including sectors on multiple tracks) can be used for the respective first and second portions.

Decision step 214 determines whether an additional pass is to be performed. At least two passes will be carried out, and in some cases multiple passes more than two will be carried out. For each additional pass, the laser power level is incremented at step 216 and the foregoing steps are repeated to obtain a different readback signal amplitude for each applied power level.

The process continues at step 218 where the change in reader protrusion is determined using equation (1). The change in writer protrusion is determined based on the reader protrusion using equation (2). A final fly height versus laser power transfer function is generated and stored at step 220. The function may take the form of a conversion table and indicates the resulting change in clearance of the write element 120 based on a given input laser power.

Figure 9:
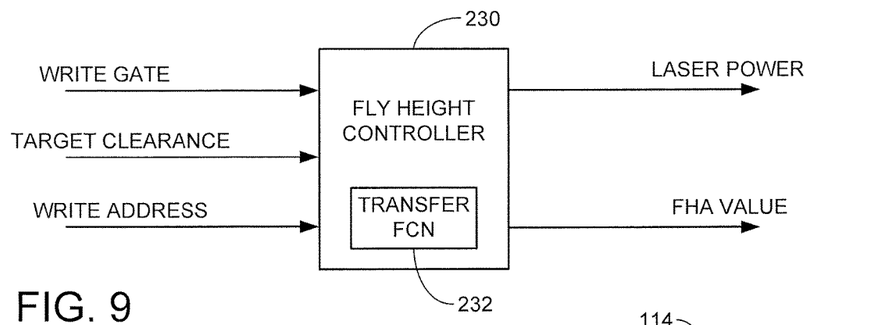
FIG. 9 is a functional representation of a fly height controller operated based on the routine of FIG. 8.

FIG. 9 shows a fly height controller circuit 230 of the device 110. The fly height controller circuit 230 may form a portion of the protrusion analysis and control circuit 140 of FIG. 3, or may form another portion of the device 110. As before, the circuit 230 may be realized in hardware, software and/or firmware.

Generally, during normal operation of the device 110 to transfer data to the medium 112 from a host device, a write gate (WG) signal will be asserted for use by the preamp 116. The write gate is also supplied to the controller 230, along with a target clearance value for the transducer during the write operation. In some cases, a write address such as in the form of a head/disc combination and/or a track radial location will also be supplied to the controller 230.

In response, the controller 230 will utilize the transfer function (represented by block 232) to output an appropriate heater power value and, as necessary, a fly height adjustment (FHA) value. In some cases, based on the amount of additional writer protrusion caused by the use of the laser during the write operation, the FHA value may be reduced. One equation that can be used is $$FHA=TC-WP \quad (3)$$

where FHA is the heater adjustment value to be supplied to the heater driver 134, TC is the target clearance and WP is the laser induced writer protrusion from equation (2). In some cases, the FHA value may be zero if the laser protrusion is sufficient to attain the desired clearance. In other cases, the laser power may be reduced to ensure the target clearance is met. Any number of methodologies can be used to implement a suitable control scheme based on the foregoing discussion.

Figure 10:
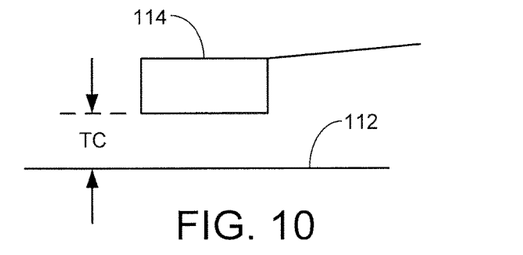
FIG. 10 shows the transducer of FIG. 4 set to a target clearance during a write operation using the fly height controller of FIG. 9.
Figure 11:
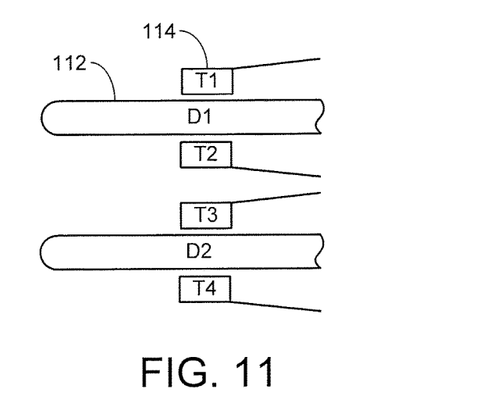
FIG. 11 illustrates multiple transducers and multiple media (disc) surfaces that can be individually controlled using FIGS. 8-9.
Figure 12:
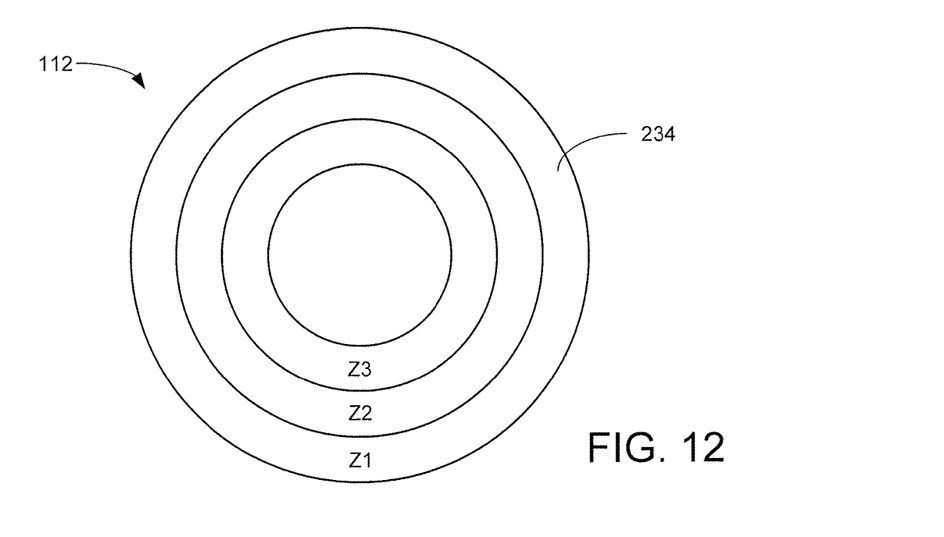
FIG. 12 shows multiple concentric zones for which different transfer functions can be generated using FIGS. 8-9.

FIG. 10 depicts a target clearance TC attained by the controller 230 of FIG. 9. FIG. 11 shows a stack of tranducers T1-T4 adjacent a pair of media discs D1-D2. Interior transducers such as transducers T2 and T3 may operate at a higher baseline temperature than exterior transducers T1 and T4, and so each of the transducers may be individually evaluated to have its own separate clearance transfer function. FIG. 12 shows a selected medium 114 with a number of concentric zones 234. Three zones Z1-Z3 are shown, although any number of zones can be used, including zones of different sizes. Different transfer functions may further be derived for different zones.

It will now be appreciated that the various embodiments disclosed herein can provide a number of benefits. Writer protrusion can be evaluated without the need to induce head-disc contact during the operation of the laser or other thermal source mechanism. Accurate adjustments to laser power and other operational parameters, such as FHA levels, can be made to establish maintain a precise fly height during write operations. In addition, the reader protrusion values can be used for reader fly height adjustments immediately after a thermally assisted write to ensure the reader is also maintained at an accurate fly height. A thermal decay transfer function can be developed and used such that, for example, during the cooling off of the transducer following an extended write, the FHA heater value can be gradually increased to maintain the transducer at a selected thermal equilibrium and desired clearance height.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
   writing a data pattern to a rotating data recording surface using a transducer having a write element, a read element and a thermal assist energy source;
   determining a first protrusion distance for the read element induced by operation of the energy source responsive to first and second readback amplitudes obtained from the data pattern using different first and second power levels applied to the energy source; and
   determining a second protrusion distance for the write element induced by the energy source responsive to the first protrusion distance using a scaling factor to convert the first protrusion distance for the read element to the second protrusion distance for the write element without requiring a measurement that induces contact between the transducer and the data recording surface.

2. The method of claim 1, wherein the first readback amplitude is obtained by positioning the read element adjacent a first portion of the data pattern, heat stressing the first portion of the data pattern by applying the first power level to the energy source, and then reading a second portion of the data pattern.

3. The method of claim 2, wherein the second readback amplitude is obtained by positioning the read element adjacent the first portion, heat stressing the first portion by applying the second power level to the energy source, and reading the second portion.

4. The method of claim 1, wherein the first protrusion distance is determined using the Wallace spacing loss equation based on the first and second readback amplitudes.

5. The method of claim 1, wherein the second protrusion distance is determined by multiplying the first protrusion distance for the read element by the scaling factor to convert the first protrusion distance for the read element to the second protrusion distance for the write element.

6. The method of claim 1, further comprising identifying a non-contacting target clearance value for the transducer for a write operation, identifying an input power level for the energy source during the write operation, and using the second protrusion distance to adjust a fly height adjustment (FHA) value applied to a FHA adjustment mechanism of the transducer responsive to the target clearance value and the input power level to maintain the identified non-contacting target clearance value.

7. The method of claim 1, wherein the data pattern is written to a plurality of sectors on a selected track on the surface, wherein the first portion of the data pattern comprises a first subset of the plurality of sectors on the selected track, and wherein the second portion of the data pattern comprises a second subset of the plurality of sectors on the selected track.

8. The method of claim 1, wherein the transducer further comprises a fly height adjustment (FHA) mechanism, wherein a baseline FHA value is supplied to the FHA mechanism during the obtaining of the first and second readback amplitudes, and wherein differences in the first and second readback amplitudes are established responsive to different first and second input power levels supplied to the energy source which induce different amounts of thermal expansion of the transducer.

9. The method of claim 1, further comprising generating a transfer function that describes a change in protrusion distance of the write element in a direction toward the surface responsive to input power level applied to the energy source, and using the transfer function to select at least a selected one of the input power level to the energy source or an input control value to a fly height adjustment (FHA) mechanism of the transducer to establish the transducer at a target clearance during a write operation.

10. The method of claim 1, wherein the first protrusion distance for the read element is determined by:
    placing the read element adjacent the data pattern;
    heat stressing a first portion of the data pattern by applying a first input power level to the energy source without supplying an input write signal to the write element;
    immediately reading a second portion of the data pattern to obtain the first readback amplitude;
    repeating the placing and heat stressing steps using a second input power level to the energy source without applying an input write signal to the write element to obtain the second readback amplitude; and
    determining the first protrusion distance responsive to $A1/A2 = e^{\wedge}[-2\pi(\Delta d)/\lambda]$ where A1 is the first readback amplitude, A2 is the second readback amplitude, $\Delta d$ is a change in protrusion distance and $\lambda$ is a write frequency at which the data pattern is written.

11. A method comprising:
    writing a data pattern to a rotating data recording surface using a transducer having a write element, a read element, a fly height adjustment (FHA) mechanism and a thermal assist energy source;
    heat stressing a first portion of the data pattern using a first power level applied to the energy source followed by reading a second portion of the data pattern using the read element to obtain a first readback amplitude;
    heat stressing the first portion of the data pattern using a second power level applied to the energy source followed by reading the second portion of the data pattern using the read element to obtain a second readback amplitude;
    determining a first protrusion distance for the read element induced by the energy source responsive to the first and second readback amplitudes; and
    determining a second protrusion distance for the write element induced by the energy source responsive to the first protrusion distance by multiplying the first protrusion distance for the read element by a scaling factor to generate the second protrusion distance for the write element, the second protrusion distance generated without requiring a measurement that induces contact between the transducer and the data recording surface.

12. The method of claim 11, further comprising using the second protrusion distance to set an input power level for the energy source responsive to a target clearance value for the transducer during a write operation.

13. The method of claim 11, further comprising applying a baseline input FHA value to the FHA mechanism to establish a baseline clearance distance for the transducer during the respective heat stressing steps, wherein differences between the first and second readback amplitudes are induced responsive to changes in thermal expansion of the transducer from the respective first and second power levels applied to the energy source.

14. The method of claim 13, further comprising using the second protrusion distance to adjust an input FHA value to the FHA mechanism responsive to a target clearance value for the transducer and an input power level for the energy source during a write operation.

15. An apparatus comprising:
    a data transducer adjacent a data recording medium, the data transducer comprising a write element, a read element and a thermal assist energy source; and a protrusion analysis and control circuit configured to determine a first protrusion distance for the read element induced by operation of the energy source responsive to first and second readback amplitudes obtained from a data pattern written to the medium using different first and second power levels applied to the energy source, and to determine a second protrusion distance for the write element induced by the energy source responsive to the first protrusion distance by multiplying the first protrusion distance by a scaling factor to produce the second protrusion distance.

16. The apparatus of claim 15, wherein the first readback amplitude is obtained by positioning the read element adjacent a first portion of the data pattern, heat stressing the first portion of the data pattern by applying the first power level to the energy source without writing data to the medium, and then reading a second portion of the data pattern using the read element.

17. The apparatus of claim 16, wherein the second readback amplitude is obtained by positioning the read element adjacent the first portion, heat stressing the first portion by applying the second power level to the energy source without writing data to the medium, and reading the second portion of the data pattern using the read element.

18. The apparatus of claim 15, wherein the protrusion analysis and control circuit determines the second protrusion distance without inducing contact between the transducer and the surface.

19. The apparatus of claim 15, wherein the protrusion analysis and control circuit uses the second protrusion distance to adjust a fly height adjustment (FHA) value applied to a FHA adjustment mechanism of the transducer responsive to a target clearance value and an input power level for the energy source during a write operation.

20. The apparatus of claim 15, wherein the protrusion analysis and control circuit operates by the following steps during which the transducer does not contact the medium;

placing the read element adjacent the data pattern;

heat stressing a first portion of the data pattern by applying a first input power level to the energy source without supplying an input write signal to the write element;

immediately reading a second portion of the data pattern to obtain the first readback amplitude;

repeating the placing and heat stressing steps using a second input power level to the energy source without applying an input write signal to the write element to obtain the second readback amplitude;

determining the first protrusion distance responsive to $A1/A2=e^{[-2\pi(\Delta d)/\lambda]}$ where $A1$ is the first readback amplitude, $A2$ is the second readback amplitude, $\Delta d$ is a change in protrusion distance and $\lambda$ is a write frequency at which the data pattern is written;

scale the first protrusion distance using a scaling factor to determine the second protrusion distance; and select a suitable power level for the energy source during a subsequent write operation during which data are written to the medium using the write element using a transfer function based on the second protrusion distance.

* * * * *